(No Model.)
A. S. DINSMORE.
OIL STOVE.
No. 260,006. Patented June 27, 1882.
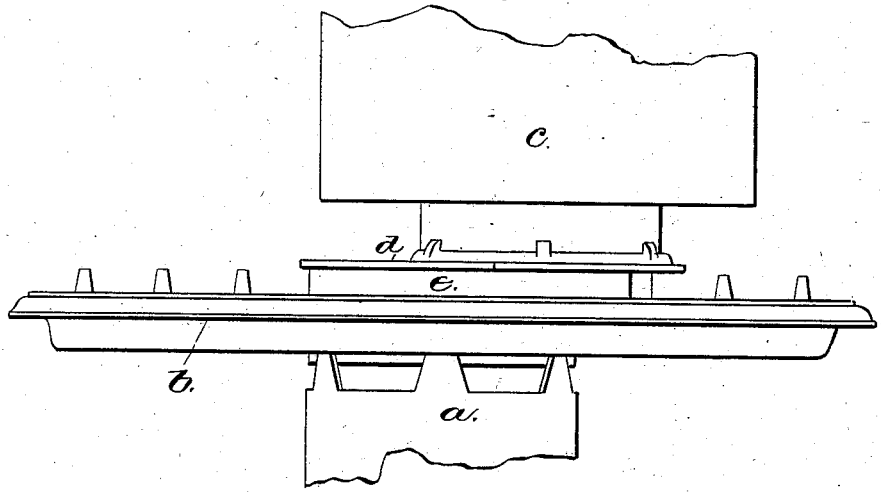
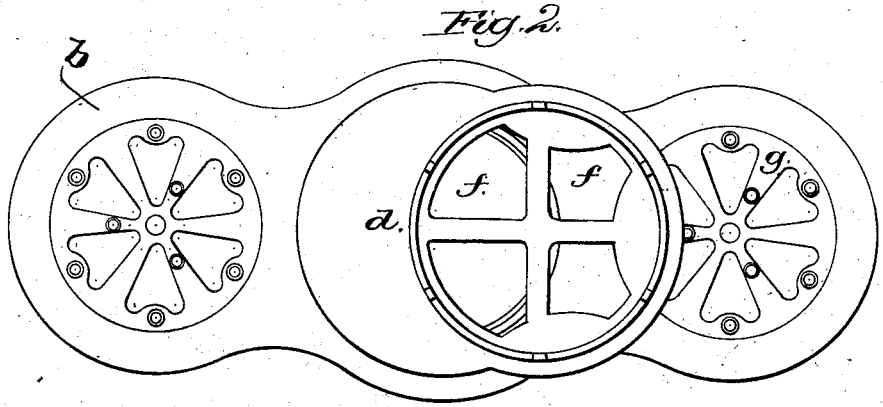
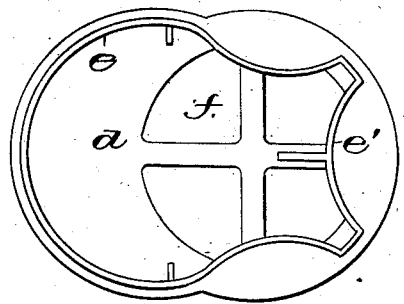
Witnesses.
John F. R. Freinkert
Fred A. Powell
Inventor
Alfred S. Dinsmore
by Crosby & Gregory
attys.

UNITED STATES PATENT OFFICE.

ALFRED S. DINSMORE, OF BOSTON, MASSACHUSETTS.

OIL-STOVE.

SPECIFICATION forming part of Letters Patent No. 260,006, dated June 27, 1882.

Application filed May 1, 1882. (No model.)

*To all whom it may concern:*

Be it known that I, ALFRED S. DINSMORE, of Boston, county of Suffolk, State of Massachusetts, have invented an Improvement in Oil-Stoves, of which the following description, in connection with the accompanying drawings, is a specification.

My invention relates to oil-stoves, and is shown embodied in an extension-top for oil-stoves such as illustrated in Letters Patent No. 246,320, dated August 30, 1881, to which reference may be had. In the said patent a detachable chamber was shown adapted to be placed upon the top of the oil-stove to receive the heat therefrom, it being provided with a central opening or stove-hole directly over the stove and two side openings in the overhanging portion of the said chamber, the said openings being provided with the usual removable stove-covers, and being adapted to receive the usual cooking utensils, three of which may thus be employed at the same time. It is, however, sometimes desirable to employ a large cooking utensil—such, for example, as an oven—for which the most direct heat, or that from the central opening, is required, and when such a utensil is in use it overhangs the side holes so as to render them both unavailable for most utensils, and the extension-chamber is thus of no advantage when a large utensil or oven is to be used, it being useful only for two or three of the smaller-sized utensils, or for a large utensil and a small one when each is placed on the side opening, so that the central or most powerful heating opening is unavailable.

The present invention has for its object to enable a large utensil to receive the heat directly, or nearly so, from the central opening, and yet leave one of the side openings available for another utensil, without increasing the size of the extension-top or in any way changing it, so that it will still retain all the capabilities of the patented top.

The invention consists in a hood or cover the under side of which fits the central opening of the stove-top, the said hood having an opening or stove-hole in its upper side eccentric to the said stove-top and adapted to receive a cooking utensil. When the said hood is in place on the central hole of the stove-top the hole in its upper side is about midway between the central and one of the side holes of the stove-top, and a utensil of such size that when placed on the middle hole it will overhang both of the side holes enough to render them both unavailable will, when placed on the hole in the said hood, be carried far enough to one side to leave the hole at the other side available, and will still get the direct heat from the central opening of the stove, as the upper and under openings of the said hood overlap one another for a considerable area.

Figure 1 is a side elevation of a portion of a stove and its extension-top provided with this invention; Fig. 2, a plan view thereof, and Fig. 3 an under side view of the hood for the central hole detached.

The stove, the top $a$ of which is shown, and the detachable extension or overhanging top or chamber $b$, having a central hole directly over the top $a$ of the stove and holes at either side thereof, may be of any usual construction, the latter being substantially as shown in the patent referred to.

When a large utensil, as the oven $c$, is placed directly on the central hole, it overhangs the side holes so as to render them unavailable, and when such a utensil is placed on one of the said side holes it is unbalanced and extends so far over the stove-top as to be in the way, and to make, moreover, the central opening, which gives the most powerful heat, unavailable. I overcome these objections by providing a hood or cover, $d$, having a downwardly-extending flange, $e$, to fit over the central hole, and a portion of the top of the stove at the side thereof, it also having a hole or opening, $f$, in its upper side, which, when the said hood is placed on the central opening of the stove-top $b$, as shown in Fig. 1, will be eccentric to the said central opening, or about midway between it and one of the side openings. The said flange $e$ has an inwardly-curved portion, $e'$, (see Fig. 3,) corresponding with the side opening of the stove-top, and thus permitting the gate or valve $g$ in the said side opening to operate freely. By this arrangement the oven $c$ or other large utensil will be supported a sufficient distance toward one side of the top $b$ to render the hole at the other side thereof available, but will not, however, overhang or project beyond the said top, and the oven $c$ or other utensil on the hole ƒ will get the direct heat from the stove as the said hole ƒ overlaps the central hole of the extension-top b. (Shown in Fig. 2.)

I claim—

The combination, with the extension top or chamber for an oil or gas stove, it having central and lateral holes, of the detachable hood for the said central hole, having an opening in its upper side eccentric to the said central hole, substantially as and for the purpose described.

In testimony whereof I have signed my name to this specification in the presence of two subscribing witnesses.

ALFRED S. DINSMORE.

Witnesses:
JOS. P. LIVERMORE,
BERNICE J. NOYES.